United States Patent [19]

Yumlu

[11] Patent Number: 4,673,423
[45] Date of Patent: Jun. 16, 1987

[54] SPLIT FLOW PARTICULATE FILTER
[75] Inventor: Salih V. Yumlu, Hagerstown, Md.
[73] Assignee: Mack Trucks, Inc., Allentown, Pa.
[21] Appl. No.: 758,062
[22] Filed: Jul. 23, 1985
[51] Int. Cl.$^4$ .............................................. B01D 46/12
[52] U.S. Cl. ...................................... 55/319; 55/321;
 55/337; 55/320; 55/476; 55/484
[58] Field of Search ................. 55/319, 320, 323, 324,
 55/337, 350, 345, 349, 476, 484, 523, 482

[56] References Cited
U.S. PATENT DOCUMENTS

| | | | |
|---|---|---|---|
| 771,414 | 10/1904 | Brown | 55/479 |
| 3,616,617 | 11/1971 | DeGroote | 55/482 X |
| 3,735,567 | 5/1973 | Viers | 55/233 |
| 3,847,577 | 11/1974 | Hansen | 55/484 X |
| 4,006,000 | 2/1977 | Tortorici et al. | 55/482 X |
| 4,256,474 | 3/1981 | Berger, Jr. et al. | 55/482 |
| 4,419,113 | 12/1983 | Smith | 55/484 |
| 4,427,423 | 1/1984 | Montierth | 55/484 X |

FOREIGN PATENT DOCUMENTS 1074013 1/1960 Fed. Rep. of Germany ........ 55/484

Primary Examiner—Charles Hart
Attorney, Agent, or Firm—Bernard, Rothwell & Brown

[57] ABSTRACT

A particulate filter for exhaust gases is disclosed which includes two filter members of suitable porous, heat-resistant material, longitudinally spaced to provide a dead space between the two filter members. The filter members are disposed within a housing in spaced relationship to the outer wall of the housing to provide an annular passage between the filter members and the outer wall of the housing for flow of exhaust gases therethrough. Provision is made for delivering exhaust gases to the dead space and then causing the exhaust gases to flow from the dead space through two paths to the outlet of the particulate filter. One of these paths provides for flow directly through one of the filter members to the outlet. The other path provides for flow of exhaust gases through the other of the filter members to the annular space and then along the annular passage external of the filter members to the outlet. A swirl plate or deflector plate may be provided to distribute the exhaust gases more uniformly over the surface of the filter members. In another embodiment of the invention the inlet for exhaust gases extends into the dead space, and is closed by a cap having a plurality of circumferentially spaced openings for distributing the exhaust gases over the surface of the filter members. Alternatively, the exhaust gases may be delivered by an inlet tangentially of an inner wall of the dead space to provide more uniform radial distribution of exhaust gases.

6 Claims, 5 Drawing Figures

SPLIT FLOW PARTICULATE FILTER

BACKGROUND OF THE INVENTION

1. Field of the Invention

This invention relates to filters or traps for removing particulate matter and particularly to such filters employed with engines, such as diesel engines, for removing particulate matter from the exhaust gases thereof.

2. Background of the Invention

It is desirable to remove particulate matter from the exhaust gases of engines in order to minimize the amount of such particulate matter discharged into the atmosphere. It is particularly desirable to provide means for effectively removing particulate matter from the exhaust gases of diesel engines.

Filters of various materials, including filters employing ceramic material, have been employed in the exhaust systems of engines, such as diesel engines, to remove particulate matter therefrom. Normally such prior art systems incorporate a filter of ceramic material and provide for flow of exhaust gases longitudinally through the filter from one end to the other. The length of ceramic filter which can be employed in such systems is limited because of the thermal gradient which occurs over the length of the filter and the resultant thermal stresses induced in the ceramic material.

Such prior art filters are also subject to substantial thermal gradient transversely of the filter, from the center toward the circumference thereof, because the exhaust gases may be for example at a temperature of 600° F., whereas the outer circumference of the ceramic filter may, in extreme conditions, be encountering temperatures as low as −40° F. This temperature gradient also results in substantial thermal stress with the potential of resultant damage to the ceramic filter.

A second deficiency of such prior art filters is that there is substantial heat loss from the filter to the atmosphere, reducing the effectiveness of the filter in burning the particulate matter flowing therethrough because of the reduced temperature of the filter. This heat loss sometimes requires the provision of supplemental heat to effectively dispose of the particulate matter.

Further, prior art particulate filters have the additional problem that in order to keep the back pressure within acceptable limits and still provide adequate surface for effective burning of the particulate matter, it may be necessary to increase the diameter of the filter to an unacceptable degree, that is, the filter diameter may have to be such that a problem is created in achieving an even distribution of exhaust gases across the filter diameter and installing the filter within the space available.

Finally, the conventional filter contributes to inflexibility in design because it materially limits the freedom of the designer to change the aspect ratio, that is the ratio of the length of the filter to its diameter, so that the designer is unable to maximize the filter area while still minimizing thermal stresses.

By the present invention these deficiencies of prior art particulate filters have been eliminated and a filter has been provided which has substantial advantages both in design and in effective operation for its desired purpose.

One object of the present invention is to provide a particulate filter which permits optimization of the aspect ratio, that is, one which permits maximization of the length of the filter relative to its diameter while still minimizing thermal stresses. This also permits limiting the pressure drop through the filter to an acceptable amount while still providing a sufficiently long filter path for effective removal of particulate matter.

Another object of the invention is to provide a more uniform distribution of exhaust gases over the surface of the particulate filter employed so as to reduce the temperature gradient across the filter and also to increase the efficiency of the filter.

Another object of the invention is to provide a particulate filter in which the heat losses from the filter are minimized so that particulate matter is burned more efficiently in passing through the filter and the need for additional heat from an external burner is minimized.

It is still another object of this invention to provide a particulate filter which, while accomplishing the above improved results, is of such shape and size that it can be readily installed in lieu of a conventional particulate filter without the necessity of significant change in the exhaust system.

Finally, it is an object of this invention to provide a particulate filter constructed in such a manner that it acts also as a noise muffler.

SUMMARY OF THE INVENTION

In carrying out the objects of the invention, in one form thereof, a particulate filter for exhaust gases is provided which includes two filter members of ceramic or other suitable porous, heat-resistant material, longitudinally spaced to provide a confined, or dead, space between the two filter members. The filter members are disposed within a housing in spaced relationship to the outer wall of the housing so as to provide an annular passage between the filter members and the outer wall of the housing for flow of exhaust gases therethrough. Provision is made for delivering exhaust gases to the confined space and then causing the exhaust gases to flow from the confined space through two paths to the outlet of the particulate filter. One of these paths provides for flow directly through one of the filter members to the outlet. The other path provides for flow of exhaust gases through the other of the filter members to the annular space and then along the annular passage external of the filter members to the outlet. In specific embodiments of the invention a swirl plate is provided in the inlet adjacent the confined space to distribute the exhaust gases more uniformly over the surface of the filter members. Alternatively, a deflector plate is provided within the confined space for this purpose. In another embodiment of the invention the inlet extends into the confined space, and the end of the inlet is closed by a cap having a plurality of circumferentially spaced openings for distributing the exhaust gases over the surface of the filter members. In still another embodiment the exhaust gases are delivered by an inlet tangentially of an inner wall of the confined space to provide more uniform radial distribution of exhaust gases. In still another embodiment of this invention, a total of four spaced filter members are employed, with a correspondingly increased number of parallel flow paths.

BRIEF DESCRIPTION OF THE DRAWINGS

The invention may be better understood by reference to the accompanying drawings in which.

DESCRIPTION OF THE PREFERRED EMBODIMENTS

Figure 1:
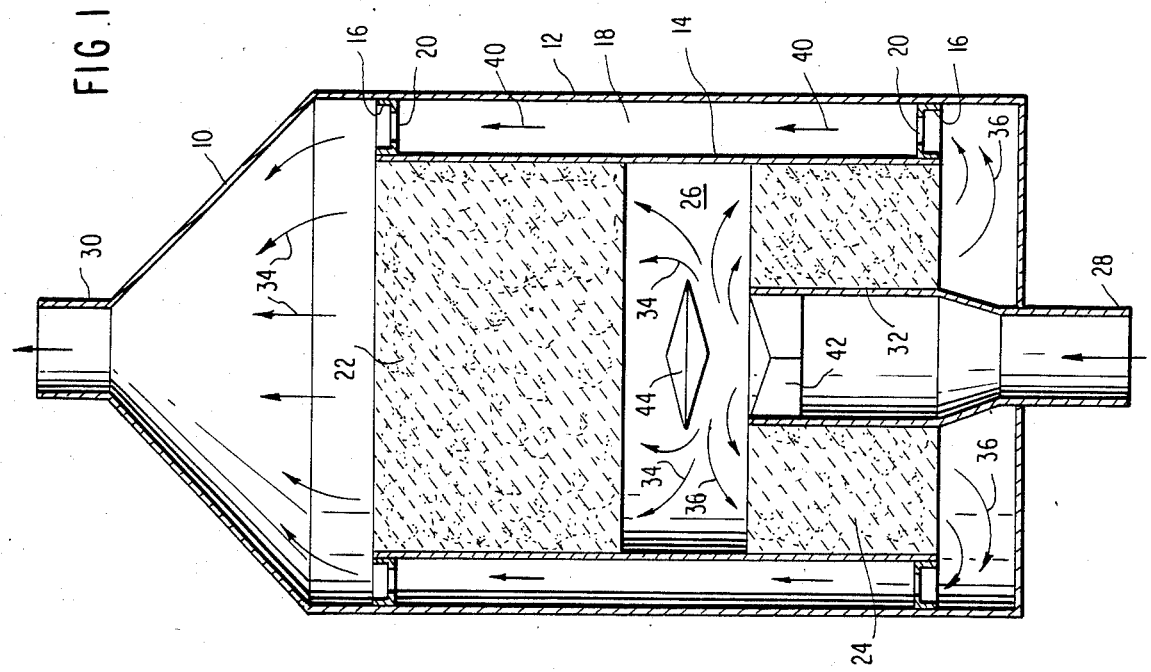
FIG. 1 is a sectional view of a particulate filter incorporating one embodiment of this invention.

Referring to FIG. 1, which illustrates one embodiment of this invention, there is shown a particulate filter which includes a housing 10. The housing is formed to include an outer wall 12 and an inner wall 14. The inner wall is supported in spaced relationship to the outer wall 12 by means of annular flange members 16 to provide an annular passage 18 between the inner and outer walls. The circumferential flange members 16 are provided with a plurality of openings 20 therein to permit gases to flow through these flange members. Alternatively, the inner walls 14 could be supported on the outer wall 12 by a plurality of circumferentially spaced flange members so that the exhaust gases could flow through the spaces between the flange members, eliminating need for the openings 20.

Positioned within the inner wall 14 are two filter members 22 and 24 which are longitudinally spaced from each other to provide a confined, or dead, space 26 therebetween. The confined space 26 may vary in length from about 2" to about 5". The filter members may be formed of any suitable porous material which is capable of withstanding the high temperature of the exhaust gases from diesel engines (around 1100° F.). For example, a ceramic material sold by Corning Glass Works under the generic name cordierite may be employed for this purpose. In order to provide for the supply of exhaust gases to the filter for removal of particulate matter from the gases, an inlet 28 is connected to the housing 10 at one end thereof and extends into the interior of the housing to direct exhaust gases into the space 26. To provide for discharge of exhaust gases from the filter 10 the housing outer wall 12 is shaped to form an outlet 30.

In the specific embodiment shown in FIG. 1 the filter element 24 is formed with a central passage 32 extending longitudinally therethrough and the inlet 28 extends through this central passage 32 to the confined space 26 for discharge of exhaust gases from the engine through the inlet 28 to the confined space 26. The provision of a particulate filter which incorporates two longitudinally spaced filter members 22, 24 with a confined space therebetween into which the exhaust gases are delivered provides for two paths through the filter members from the inlet to the outlet. In one path the exhaust gases delivered from the inlet to the confined space 26 flow in the general direction indicated by the arrows 34 directly through the filter member 22 to the outlet 30, and a substantial amount of the particulate matter is caused to be burned by the high temperature as the exhaust gases pass through this filter member. A second portion of the exhaust gases passes through the filter member 24 in the direction generally indicated by the arrows 36 and particulate matter therein is caused to be burned as the hot gases flow through the filter member 24. The gases through this second flow path are caused to reverse direction after passing through the filter member 24 and to pass thereafter in the direction indicated by the arrows 40 through the annular passage 18 between the outer wall 12 and the inner wall 14 of the filter and thence to the outlet 30.

Thus the particulate filter illustrated in FIG. 1 provides split flow paths for the exhaust gases delivered thereto and the construction employed achieves the improved results of this invention. By providing two longitudinally spaced particulate filter members 22 and 24 with a confined space therebetween for reception of exhaust gases a total flow path for exhaust gases of a length corresponding to the combined length of filter members 22 and 24 is provided but the longitudinal thermal stresses encountered in prior art particulate filters made of a single filter member are substantially reduced. This reduction in thermal stresses is achieved because the temperature gradient along the length of each of the filter members 22 and 24 is substantially less than would occur along a single filter member having the combined length of these two filter members. Thus, for a given length of flow path necessary to achieve a desired removal of particulate matter, the filter of this invention provides a substantially reduced temperature gradient along the length of the filter member and correspondingly reduced thermal stresses longitudinally of the filter.

Further, the filter of this invention makes it possible to significantly reduce the pressure drop through the filter while still providing a total flow path of sufficient length for effective removal of particulate matter from the exhaust gases.

The arrangement of the filter members spaced from the outer wall 12 of the housing by the annular passage 18 through which the hot exhaust gases flow substantially reduces the heat losses encountered in prior art filters and thereby significantly increases the effectiveness of the particulate removal by burning. Specifically, without the benefit of the outer annular chamber and the hot gases flowing therethrough the exterior circumference of prior art filters is subjected directly to ambient temperature which, in cold weather, may be well below 0° F. Thus the temperature of the outer circumferential portion of the filter member of such prior art structures is substantially reduced and external heat from an auxiliary burner may have to be supplied thereto to insure effective burning of the particulate matter passing through this portion of the filter. In addition, because of the low temperature of the outer circumferential area of the filter in such prior art structures and the high temperature of the exhaust gases, there is a substantial temperature gradient between the central portion of the filter which is subjected to exhaust gases at a temperature of perhaps 1100° F. and the outer circumferential portion which is subjected to ambient temperature, which may be as low as −40° F. Such a substantial temperature gradient transversely of the filter member creates substantial thermal stresses and potential damage to the filter member. The arrangement of this invention which incorporates the surrounding annular path for flow of hot exhaust gases both minimizes the temperature gradient across the filter members and the thermal stresses resulting therefrom and also substantially reduces the heat loss from the filter members to the atmosphere, so that substantially the entire cross sectional area of the filter members is maintained at a temperature sufficient to effectively burn the particulate matter passing therethrough.

In order to prevent the exhaust gases entering through the inlet 28 from being directed predominantly to the central portion of the filter member 22, the embodiment shown in FIG. 1 includes a swirler 42. The swirler 42 comprises a plurality of vanes shaped to impart rotating motion to the incoming exhaust gases and thereby to direct these gases more uniformly over the entire cross sectional surface of the filter members and more effectively utilize the entire cross-sectional area of the filter members.

Alternatively, as also shown in FIG. 1, a deflector 44, which is positioned in the space 26 between the filter member 22 and the filter member 24, may be employed to minimize the concentration of incoming exhaust gases against the central portion of the filter member 22. The deflector 44 is of somewhat diamond-shaped cross-section and is positioned directly in line with the end of the inlet 28 so that exhaust gases passing through the inlet 28 into the confined space 26 are deflected transversely to distribute these gases over a larger area of the filter member 22. If desired, both the swirler 42 and the deflector 44 may be employed.

Figure 2:
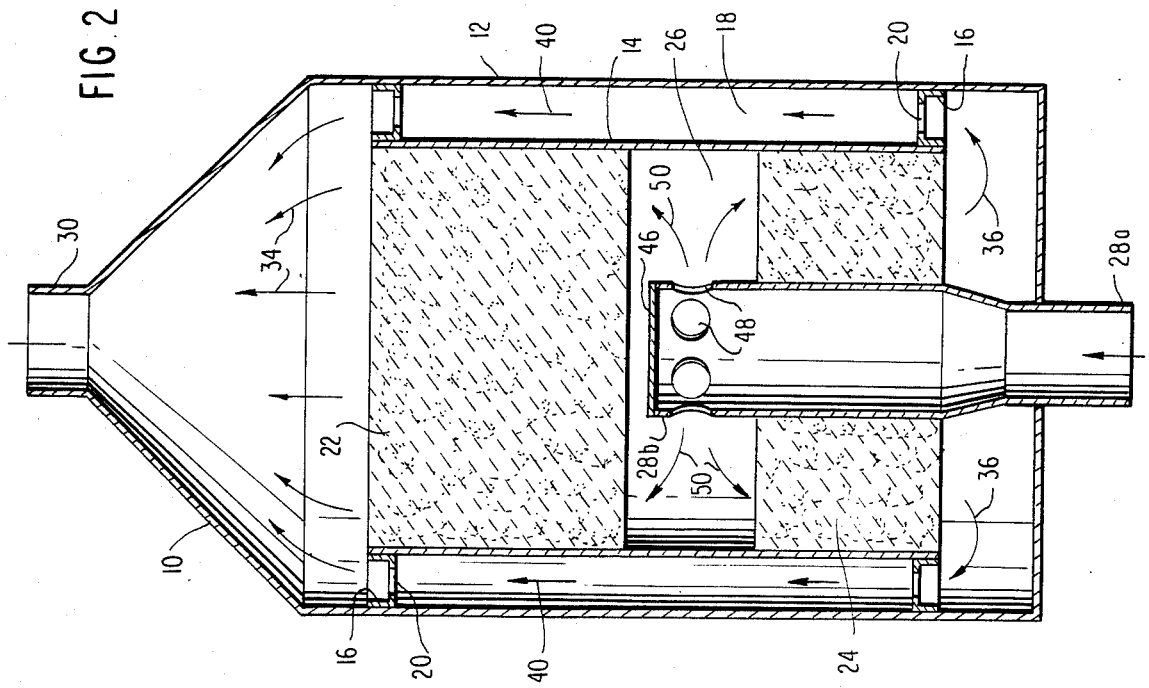
FIG. 2 is a sectional view of a particulate filter illustrating a second embodiment of this invention.

A second embodiment of this invention is shown in FIG. 2. Elements in FIG. 2 which correspond to elements in the embodiment of FIG. 1 have been given the same numerals. The embodiment shown in FIG. 2 provides still another arrangement for effectively distributing the incoming exhaust gases over a wider area of the surfaces of filter members 22 and 24. The inlet 28a is formed to extend beyond the upper end of filter member 24 and into the confined space 26 between filter members 22 and 24. The end of the inlet 28a is closed by a cap or cover 46. A plurality of openings 48 are circumferentially spaced about the portion 28b of inlet 28 which projects into the confined space 26. Movement of the exhaust gases longitudinally of the inlet 28a is blocked by the cap 46 and the exhaust gases are thereby caused to be discharged radially through the plurality of circumferential openings 48, as indicated by the arrows 50, thereby distributing the gases more widely and more uniformly over the surfaces of the filter members 22 and 24.

Figure 3:
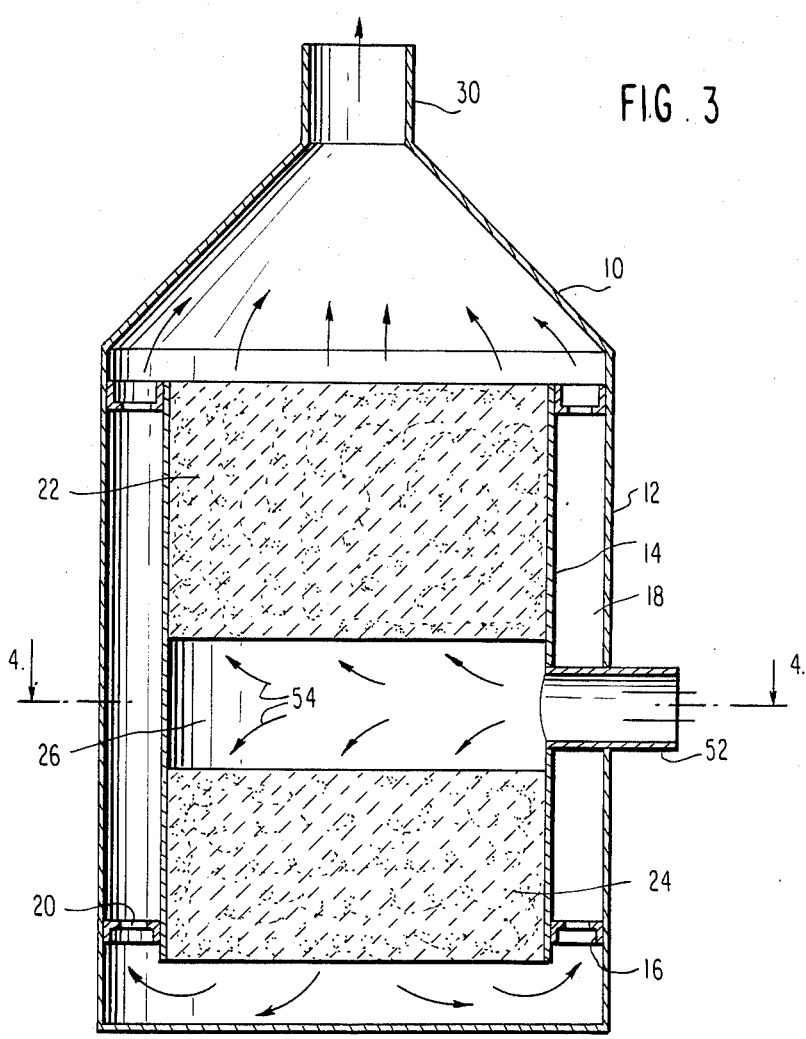
FIG. 3 is a sectional view of a particulate filter illustrating a third embodiment of this invention.
Figure 4:
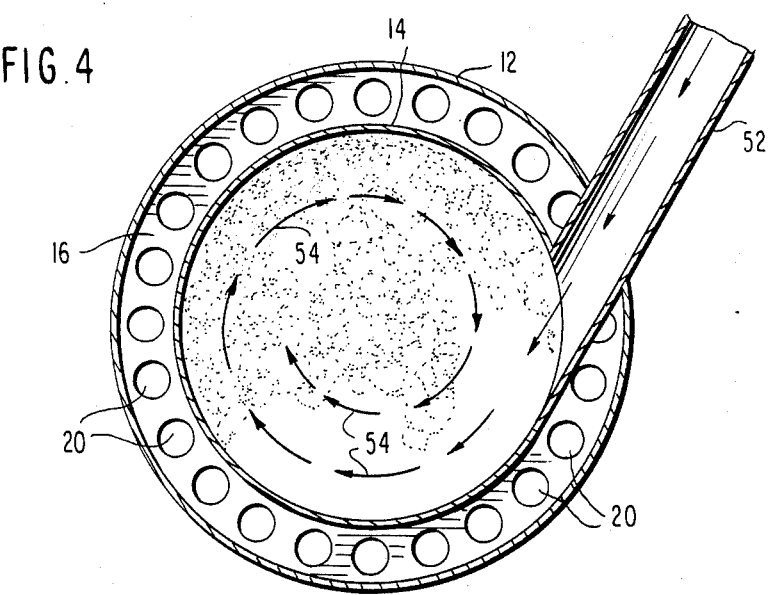
FIG. 4 is a sectional view taken along the line 4—4 in FIG. 3, illustrating the flow of exhaust gases in the embodiment of FIG. 3.

Another arrangement for introducing the exhaust gases into the confined space 26 and effecting a more uniform distribution of the gases with respect to the surfaces of the filter members 22 and 24 is shown in FIGS. 3 and 4. The elements common to this embodiment and to the embodiment of FIG. 1 have been given the same numerals.

In the embodiment of FIGS. 3 and 4, the inlet 52 for exhaust gases, in lieu of being directed longitudinally of the filter as in the embodiments disclosed in FIGS. 1 and 2, is positioned so as to direct the exhaust gases through the side wall of the housing into the confined space 26. The inlet 52 extends through the spaced outer and inner walls 12 and 14, respectively, and into the confined space 26 between the filter members 22 and 24. As shown in FIG. 4 the inlet 52 is positioned so as to direct the exhaust gases substantially tangentially of the inner wall 14 and to impart a generally spiral effect to the exhaust gases within the confined space 26, as indicated by the arrows 54 in FIG. 4. This arrangement for introducing exhaust gases into the filter effects a more uniform distribution of the gases over the surfaces of the filter members 22 and 24 and thereby makes more effective utilization of these filter members.

Figure 5:
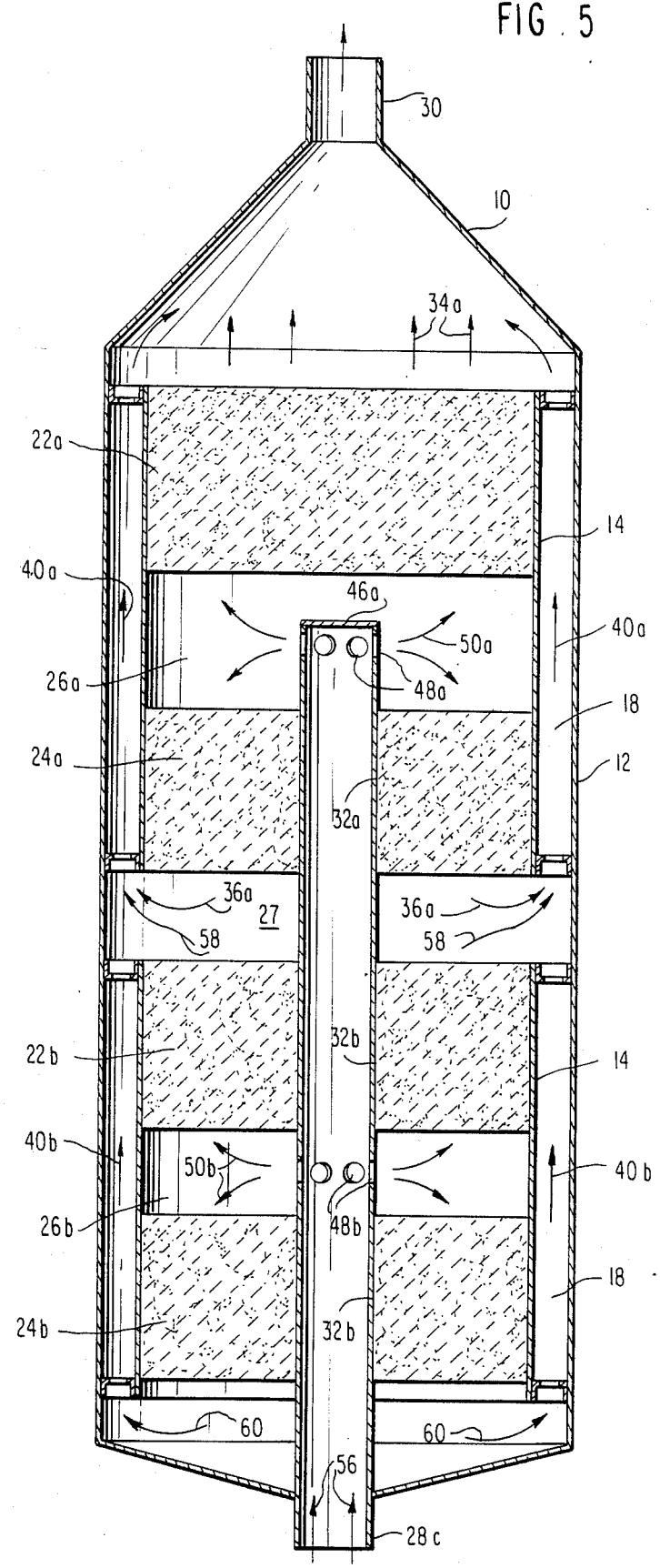
FIG. 5 is a sectional view of a particulate filter illustrating a fourth embodiment of this invention.

In some cases, it is desirable to reduce the diameter of the particulate filter to the maximum extent possible and still keep the back pressure to a reasonable level. The modification shown in FIG. 5 is designed to accomplish this multiple objective effectively. The elements shown in FIG. 5 which are the same as those shown in other embodiments of FIG. 1 have been given the same numerals.

The modification shown in FIG. 5 differs from that in FIG. 2 primarily by employing two pairs of filter members 22a, 24a and 22b, 24b, in lieu of the single pair of filter members 22 and 24 employed in the embodiment of FIG. 2. The filter members 22a and 24a shown at the upper portion of the particulate filter illustrated in FIG. 5 are spaced, in the manner of the filter members 22 and 24 of FIG. 2, to provide a confined space 26a therebetween. Similarly, the lower filter members 22b and 24b are spaced to provide a confined space 26b therebetween. Further, the two pairs of filter members are spaced to provide a space 27 between filter member 24a and filter member 22b. The inner wall 14 does not extend into this area so that space 27 is not a confined space and there is free communication for flow of exhaust gases from the space 27 to the annular passage 18.

In this embodiment, each of the filter members 22b and 24b is formed to include a central passage 32b for the inlet 28c. Further, the lower of the two upper filter members, namely 24a, includes a corresponding central passage 32a. The inlet 28c in this embodiment therefore extends through central passages in filter elements 24a, 22b, and 24b and terminates in the confined space 26a. The upper end of the inlet 28c is formed similarly to that employed in the embodiment shown in FIG. 2. Thus, the upper end is closed by a cap or cover 46a. Also, in a manner similar to the construction employed in the embodiment of FIG. 2, the inlet 28c is provided within the confined space 26a with a plurality of circumferentially spaced openings 48a for discharge of exhaust gases into the space 26a. Further, a similar plurality of circumferentially spaced openings 48b are provided in the inlet 28c within the confined space 26b to provide for discharge of exhaust gases therethrough into the space 26b.

It can be seen that the embodiment of FIG. 5 provides a greater number of parallel flow paths for exhaust gases than the embodiments previously described. Specifically, the embodiment of FIG. 5 provides four separate parallel flow paths through four separate filter members. Two flow paths, those through the upper pair of filter members 22a and 24a, correspond to those of the embodiment shown in FIG. 2. Thus, exhaust gases entering the inlet 28c of the particulate filter in the direction of the arrows 56 pass upwardly through the inlet 28c and through the plurality of circumferentially spaced openings 48a into the confined space 26a. The exhaust gases discharged into the space 26a flow, in a manner corresponding to the flow in the embodiment of FIG. 2, in two parallel paths through the filter members 22a and 24a, as indicated by the arrows 50a. One flow path extends through the filter member 22a directly to the outlet 30, as indicated by the arrows 34a. The other flow path for exhaust gases extends through the filter member 24a in the direction of the arrows 36a into the annular passage 18 and through this passage, as indicated by the arrows 40a, to the outlet 30. Thus, the upper two filter members 22a and 24a provide two parallel flow paths through the filter members in a manner corresponding to the embodiment of FIG. 2.

In addition to these two flow paths, two further parallel flow paths for exhaust gases through the particulate filter are provided by the lower two filter members 22b and 24b. The exhaust gases flowing through the inlet 28c pass through the plurality of circumferentially spaced openings 48b into the confined space 26b between the filter members 22b and 24b. Thus, the exhaust gases flow in the direction of the arrows 50b in two parallel paths, one through the filter member 22b and the other through the filter member 24b. The exhaust gases passing through the filter member 22b flow, as indicated by the arrows 58, into the annular passage 18 and thence to the outlet 30, as indicated by the arrows 40a. Exhaust gases passing through the filter member 24b flow, as indicated by the arrows 60, into the annular passage 18 and thence, as indicated by the arrows 40b and 40a, through this annular passage to the outlet 30.

It is desirable to balance the flow of exhaust gases through the openings 48a and 48b so that approximately half of the exhaust gases are directed to the upper pair of filter members 22a and 24a and half to the lower pair of filter members 22b and 24b. This may be accomplished by correlating the length of the filter members 22a and 24a relative to the length of the filter members 22b and 24b, thereby balancing the back pressures in the two pairs of filter members and dividing the flow of exhaust gases approximately equally. Alternatively, or in addition to the correlating of the length of the filter members, the size of the openings 48a relative to the openings 48b may be selected so as to achieve the desired balanced flow of exhaust gases.

By doubling the number of flow paths through the particulate filter, applicant has provided a structure in which the diameter of the particulate filter can be reduced and yet adequate filter surface for the necessary burning of the particulate matter can be provided without raising the exhaust back pressure above an acceptable level.

By the applicant's invention, a number of advantages in addition to those discussed above are achieved. For example, by making the filter of two separate filter members arranged as disclosed in this application, design flexibility is provided. A filter can be provided which has adequate capacity for effective removal of particulate matter while still keeping the pressure drop within acceptable limits. Thus, the two filter members providing the parallel paths for flow of exhaust gases may be chosen to have adequate length and cross-section for effective removal of particulate matter and yet the pressure drop through the parallel flow paths may be kept within acceptable limits. Further advantages are achieved by employing two pairs of filter members, as shown in FIG. 5.

Further, the applicant's arrangement provides a convenient way for obtaining a desired efficiency. Filter components available commercially have varying standardized filtering efficiencies running up to 90%. If a filter efficiency not provided by such commercially-available filter components is desired, this may be achieved by making one of the filter members of the applicant's structure of a filter efficiency higher than that desired for the overall structure and the other of a filter efficiency lower than that desired for the overall structure and then combining particular lengths of the two filter members to achieve the desired filter efficiency.

Also, the applicant's filter construction which provides for directing exhaust gases into an inner confined, or dead, space 26, or confined spaces 26a and 26b, permits the use of the applicant's filter as a muffler in addition to its use as a particulate filter.

It is claimed:

1. A particulate filter for engine exhaust gases comprising:
    (a) a housing;
    (b) first and second filter members arranged within said housing, said filter members being spaced from each other and including means providing a confined space between said filter members;
    (c) said filter members being spaced from said housing to provide an annular space between said filter members and said housing;
    (d) means providing an inlet into said housing for supplying exhaust gases to said confined space;
    (e) means defining an outlet from said housing for exhaust gases;
    (f) said exhaust gases being directed from said confined space along two paths, one path extending through said first filter member to said outlet and the other path extending through said second filter member and through said annular space to said outlet;
    (g) said second filter member including a central passage therethrough and said inlet extending through said passage to said confined space; and
    (h) a swirler disposed in said central passage adjacent said confined space to distribute exhaust gases more uniformly over the surfaces of said filter members facing said confined space, said swirler having a radial dimension substantially the same as that of said central passage.

2. A particulate filter for engine exhaust gases comprising:
    (a) a housing;
    (b) first and second filter members arranged within said housing, said filter members being spaced from each other and including means providing a confined space between said filter members;
    (c) said filter members being spaced from said housing to provide an annular space between said filter members and said housing;
    (d) means providing an inlet into said housing for supplying exhaust gases to said confined space;
    (e) means defining an outlet from said housing for exhaust gases;
    (f) said exhaust gases being directed from said confined space along two paths, one path extending through said first filter member to said outlet and the other path extending through said second filter member and through said annular space to said outlet;
    (g) said second filter member including a central passage therethrough and said inlet extending through said passage to said confined space; and
    (h) a deflector positioned within said confined space in line with said central passage and having a radial dimension substantially the same as that of said central passage for distributing exhaust gases more uniformly over the surfaces of said filter members facing said confined space.

3. A particulate filter for engine exhaust gases comprising:
    (a) a housing;
    (b) first and second filter members arranged within said housing, said filter members being spaced from each other and including means providing a confined space between said filter members;
    (c) said filter members being spaced from said housing to provide an annular space between said filter members and said housing;

(d) means providing an inlet into said housing for supplying exhaust gases to said confined space;
(e) means defining an outlet from said housing for exhaust gases;
(f) said exhaust gases being directed from said confined space along two paths, one path extending through said first filter member to said outlet and the other path extending through said second filter member and through said asnnular space to said outlet;
(g) said second filter member including a central passage therethrough and said inlet extending through said passage to said confined space;
(h) a swirler disposed in said central passage adjacent said confined space to distribute exhaust gases more uniformly over the surfaces of said filter members facing said confined space; and
(i) a deflector is positioned within said confined space in line with said central passage and said swirler for distributing exhaust gases more uniformly over the surfaces of said filter members facing said confined space.

4. A particulate filter for engine exhaust gases comprising:
(a) a housing;
(b) first and second filter members arranged within said housing, said filter members being spaced from each other and including means providing a confined space between said filter members;
(c) said filter members being spaced from said housing to provide an annular space between said filter members and said housing;
(d) means providing an inlet into said housing for supplying exhaust gases to said confined space;
(e) means defining an outlet from said housing for exhaust gases;
(f) said exhaust gases being directed from said confined space along two paths, one path extending through said first filter member to said outlet and the other path extending through said second filter member and through said annular space to said outlet;
(g) said inlet including a tubular portion extending into said confined space, a cap closing the end of said tubular portion, and a plurality of circumferentially spaced openings in said tubular portion in line with said confined space for distributing exhaust gases more uniformly over the surfaces of said filter members facing said confined space.

5. The particulate filter of claim 4 wherein:
(a) third and fourth filter members are provided, said third and fourth filter members being spaced from each other to provide a second confined space therebetween;
(b) said third and fourth filter members also being spaced from said first and second filter members;
(c) said tubular portion extending through said second confined space;
(d) a second plurality of circumferentially spaced openings being provided in line with said tubular portion in said second confined space for discharge of exhaust gases therethrough;
(e) said exhaust gases flowing in parallel paths through said third and fourth filter members and through said annular space to said outlet.

6. A particulate filter for engine exhaust gases comprising:
(a) a housing including an outer wall and an inner wall spaced from said outer wall to provide an annular space therebetween;
(b) first and second filter members disposed within said inner wall, said filter members being spaced from each other to provide a confined space between said filter members;
(c) means providing an inlet for supplying exhaust gases to said confined space;
(d) means defining an outlet for exhaust gases;
(e) said exhaust gases being directed from said confined space along two paths, one path extending through said first filter member to said outlet and the other path extending through said second filter member and through said annular space to said outlet;
(f) said inlet extending through said outer and inner walls and into said confined space and said inlet being positioned to direct exhaust gases generally tangentially relative to said inner wall.

* * * * *